United States Patent [19]

Parsons

[11] 4,215,788
[45] Aug. 5, 1980

[54] RAILROAD TANK CAR AND METHOD FOR TRANSPORTING LIQUIDS

[75] Inventor: James D. Parsons, Munster, Ind.

[73] Assignee: Union Tank Car Company, Lincolnshire, Ill.

[21] Appl. No.: 932,818

[22] Filed: Aug. 10, 1978

[51] Int. Cl.² ............................................. B65D 25/06
[52] U.S. Cl. .................................... 220/22; 220/85 B; 222/386.5
[58] Field of Search ............................... 220/22, 85 B; 222/386.5

[56] References Cited

U.S. PATENT DOCUMENTS

| | | | |
|---|---|---|---|
| 2,884,978 | 5/1959 | Grimm | 220/85 B |
| 3,502,204 | 3/1970 | Paton | 220/85 B |

FOREIGN PATENT DOCUMENTS 2724221  12/1977  Fed. Rep. of Germany ......... 220/85 B Primary Examiner—George E. Lowrance
Attorney, Agent, or Firm—Joel E. Siegel; Charles M. Kaplan

[57] ABSTRACT

A flexible diaphragm can be moved to line opposite surfaces of a vehicle so that incompatible fluids alternately can be transported in the vehicle without the need for cleaning it. The edge of the diaphragm may be held against the inside surface of the vehicle container by a series of aligned clamps that are independently movable. The terminal edge of the diaphragm is enclosed in a transient pressure absorbing chamber defined in part by the under surface of the clamps which enables the clamps to exert increased sealing pressure on the diaphragm during the transient pressure surges caused by movement of the liquid when the vehicle changes speed or direction suddenly.

20 Claims, 4 Drawing Figures

U.S. Patent     Aug. 5, 1980     4,215,788
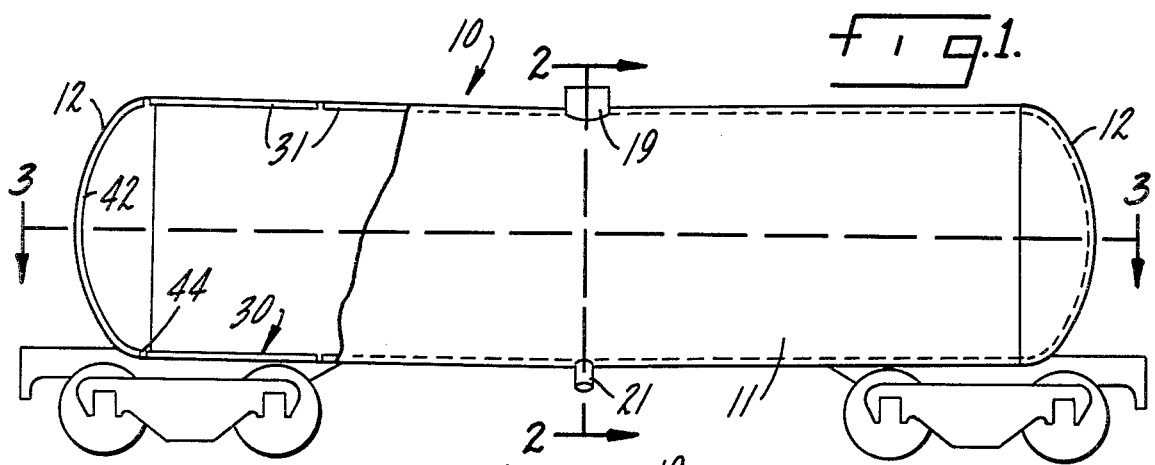
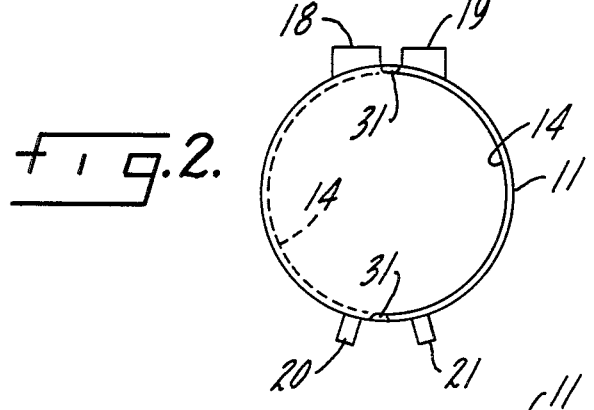
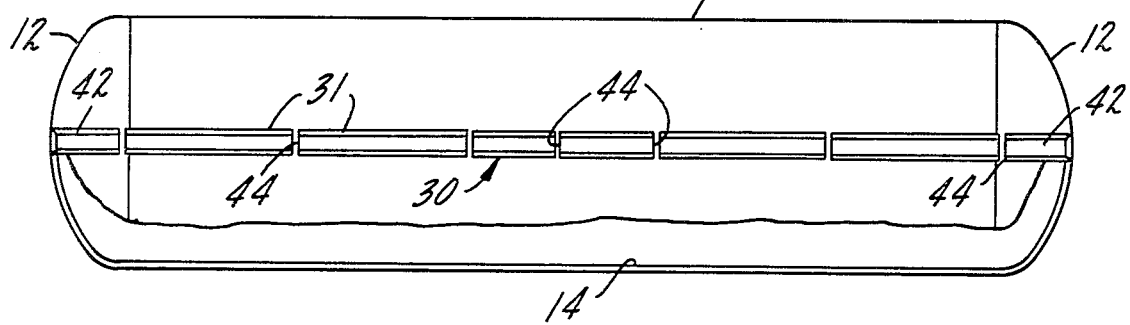
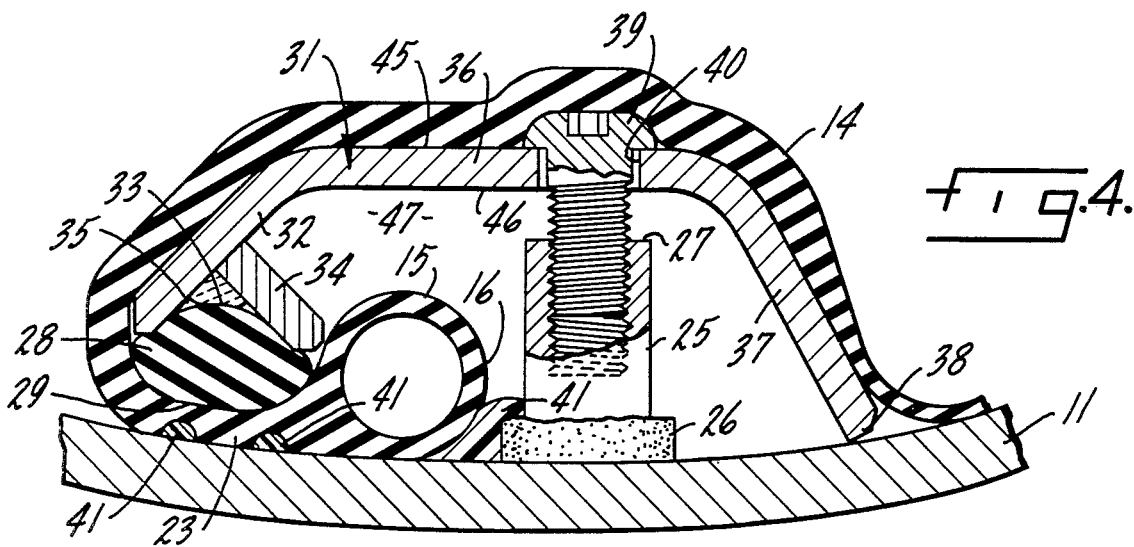

RAILROAD TANK CAR AND METHOD FOR TRANSPORTING LIQUIDS

BACKGROUND OF THE INVENTION

This invention relates to the storage of fluids, and more particularly to wheeled vehicles for transporting different liquids in a given container.

When a tank truck or a railroad tank car transporting a particular gas or liquid is to be used to transport a different non-compatible fluid, it is necessary to clean the container of the vehicle. This is usually expensive and inconvenient, and the required specialized cleaning facilities frequently are not available. To solve this problem, it has been proposed that vehicles for transporting fluids be provided with a pair of separate inlets and outlets and a flexible diaphragm that alternately lines opposed sides of the vehicle's container. Movement of the diaphragm to line one side of the container provides a chamber for one fluid, and movement of the diaphragm to the opposite side of the container provides a chamber for a different non-compatible fluid. Thus, the container does not have to be cleaned to enable the vehicle to transport either of such fluids. However, there has not been any significant use of such vehicles having a diaphragm that enables them to alternately carry non-compatible fluids without being cleaned in between. One reason such vehicles have not been used has been the lack of a satisfactory clamping arrangement for preventing leakage of a fluid between the diaphragms and container and for ensuring that the diaphragm will not tear or be pulled loose from the container.

In particular, the diaphragm must be able to resist being pulled out or torn and must not permit leakage during localized transient pressure surges that occur when a vehicle stops, starts or changes direction or speed suddenly. Such movements cause liquid in the vehicle to surge toward its end and may locally trap and compress gas. This can cause the portion of the diaphragm being clamped to be subjected to a localized transient increase in pressure (e.g. 250 p.s.i. for 2 miliseconds). Although the pressure quickly returns to normal as the liquid surge subsides, any leakage under or through the diaphragm or its clamp which occurs as a result of such a surge necessitates that the container be cleaned before a different liquid can be transported.

OBJECTIVES OF THE INVENTION

Accordingly, it is an object of this invention to provide improved means for transporting or storing non-compatible liquids.

Another object is to provide vehicles with clamped diaphragms that do not leak as a result of transient pressure surges.

Another object is to provide an improved clamp for hermetically sealing a flexible diaphragm against a container wall surface.

Another object is to seal a flexible diaphragm against a container wall without having to inflate the sealing mechanism.

Another object is to provide a clamp that can seal different sized diaphragms with enlarged end beads of differing size or shape.

Another object is to provide a clamp for a flexible diaphragm that need not be welded to the wall of a container.

Another object is to provide a way of clamping a diaphragm to a tank wall in which the clamp can increase its sealing pressure during a transient pressure surge without being subjected to additional bending forces caused by deflection.

Another object is to provide for the sealing of a flexible diaphragm against a container wall without having to pass fasteners or tension bearing members through the diaphragm.

Another object is to use a continuous O-ring as a spring that seals a diaphragm against a surface of a container wall despite irregularities in such surface.

Another object is to provide a relatively inexpensive, durable, easily maintained railroad tank car with a flexible diaphragm sealed against the inside surface of its container that does not possess defects found in similar prior art tank cars.

Other objects and advantages of the invention will be apparent from the specification and claims, and the scope of the invention will be pointed out in the claims.

DESCRIPTION OF THE DRAWING

FIG. 1 is a schematic, partially, broken-away side view of a railroad tank car in accord with this invention.

FIG. 2 is a cross sectional view taken along the line 2—2 in FIG. 1.

FIG. 3 is a cross sectional view taken along the line 3—3 in FIG. 1, showing the diaphragm in the position as in FIG. 2, with an alternate phantom line showing.

FIG. 4 is an enlargement of the cross sectional view of the clamp shown in FIG. 2.

DESCRIPTION OF THE INVENTION

The drawing shows a railroad tank car 10 including a metal tank 11 for containing and transporting alternately two different non-compatible liquids, such as lube oil and diesel oil. Container tank 11 is generally cylindrical, and has a generally horizontal longitudinal axis; its ends are closed by dished heads 12. Tank 11 encloses a diaphragm 14 made from a flexible material such as a nylon-fabric-reinforced Buna-N rubber having an integral enlarged bead 15 defining a terminal edge 16 extending around its entire periphery. A pair of manways 18 and 19 including conventional liquid inlets are located adjacent the upper surface of tank 11 on opposite sides of its longitudinal center, and a pair of conventional liquid outlets 20 and 21 are located adjacent the lower surface of tank 11 on opposite sides of its longitudinal center. Car 10 should be provided with other necessary conventional components and accessories, such as trucks, draft gear and gauges, which do not form part of the present invention.

When tank 11 is filled with a specific liquid through the inlet in manway 18, diaphragm 14 will lie against the inside wall surface of tank 11 and define a chamber for such liquid, as shown in solid lines in FIG. 2; such liquid would be drained through outlet 20. When tank 11 is filled with a non-compatible liquid through the inlet in manway 19, diaphragm 14 will be against the inside wall surface of tank 11 and define a different chamber for the non-compatible liquid, as shown in phantom in FIG. 2; this liquid would be drained through outlet 21. The separate chambers for non-compatible liquids are hermetically isolated, so it is not necessary to clean tank 11 whenever car 10 carries either of such liquids.

Bead 15 and the immediately adjacent area 23 of diaphragm 14 contact the inside wall surface of tank 11 in a first vertical plane which generally bisects tank 11 longitudinally. Means for sealing diaphragm 14 against tank 11 includes a plurality of first fastener elements such as studs 25 each of which has one end 26 welded to the wall of tank 11 at spaced intervals and female threads at its other or inner end 27. Studs 25 essentially lie in a second vertical plane that is spaced from but parallel to the first vertical plane that includes diaphragm peripheral area 23. An endless, solid O-ring gasket 28 made from a resilient material has a surface 29 that contacts area 23 of diaphragm 14 outside of the first plane, which does not contain studs 25; when not compressed, gasket 28 has a circular cross section.

A clamp or enclosure 30 shaped to conform to the inside surface of the wall of tank 11 is made from a series of separate, aligned, independently movable clamp members 31, and 42. Each clamp member 31 has a first arm 32 at one end which contacts an opposite surface 33 of gasket 28. The end of arm 32 is bifurcated into an inverted Y shape defined by a branch 34 welded to arm 32. Gasket 28 is compressed and confined in the bifurcated fork or crotch 35 of such Y. Crotch 35 holds gasket 28 away from bead 15 at the peripheral edge of gasket 14. Each clamp member 31 has a central portion 36 that is generally parallel to the adjacent surface of the wall of tank 11. Each central portion 36 extends over bead 15 and a plurality of studs 25. Each clamp member 31 also has a second arm 37 at its opposite end which has a terminal edge 38 that contacts but is not attached to the wall of tank 11. First arm 32 is in a plane which intersects the adjacent wall surface of tank 11, and second arm 37 is in another plane which intersects the adjacent tank wall surface, and the planes of arms 32 and 37 intersect each other.

Second threaded fastener elements such as bolts 39 pass through oversized holes 40 in central portion 36 of each clamp member 31 and mate with the threads in studs 25. Tightening or loosening of bolts 39 in the end 27 of studs 25 adjusts the compressive force with which the arm 32 of each independently movable clamp member 31 engages gasket 28 and hence the force exerted by each member 31 in sealing area 23 of diaphragm 14 against the tank wall. Each clamp member is dimensioned so as to be removable through either manway 18 or 19.

A sealant or mastic 41 such as a polysulfide liquid polymer compound may be applied between the terminal edge 16 and area 23 of diaphragm 14 and the wall of tank 11.

Clamp members 42 at heads 12 are identical to members 31 except that members 42 are curved to conform in shape to the inside wall of tank 11 at the heads. The ends 44 of the clamp members are located as close as possible to each other (i.e. 1/16 to ⅛ inch), and gasket 28 bridges and seals the small gap between ends 44.

Each clamp member 31 and 42 has an outer or first surface 45 which faces toward the contents of tank 11 and away from the wall or surface of tank 11. A second or inner surface 46 of each clamp member 31 and 42 faces toward the inside wall surface of tank 11. Thus the individual clamp members 31 and 42 collectively define a composite clamp or enclosure 30 which surrounds the entire periphery of diaphragm 14 including its terminal edge 16 and compresses the portion of the diaphragm periphery spaced inwardly from terminal edge 16 in sealing engagement against the inside surface of the tank wall by a force exerted by enclosure 30. The aligned inwardly facing second surfaces 46 of the clamp members 31 and 42 define a transient pressure absorbing chamber 47 which encloses the diaphragm terminal edge 16.

During the transient localized pressure surges that occur when a liquid transporting vehicle stops, starts or changes speed or direction suddenly, the pressure rise in chamber 47 will lag the transient pressure rise in tank 11. The pressure rise in chamber 47 will obviously lag that in tank 11 when diaphragm 14 overlies the clamp members as shown in FIG. 2. The lag in pressure rise in chamber 47 usually occurs when diaphragm 14 is in the position where it does not cover the clamp members, evan though there may be small spaces between the clamp member ends 44 and at holes 40 and edges 38 because the pressure surges are so large and of such short duration. This results in a pressure differential on opposite sides of the clamp members which causes them to quickly pivot around their terminal edges 38 and thereby quickly increase the compressive force sealing the periphery of diaphragm 14. Since edges 38 are unattached to the wall of tank 11 and since bolts 39 do not bind in oversized holes 40, the clamp members need not be deflected or bent before their arms 32 can pivot to further compress gasket 28 against diaphragm area 23. The transient pressure increases usually are isolated or localized in relatively small areas of car 10 and thus affect only a single or a small number of the individual clamp members. Since the clamp members are not connected to each other, and hence are independently movable, each particular clamp member is also free to pivot about its edge 38 without incurring or causing bending stress because the adjacent clamp member or members are not subjected to the same localized transient pressure surge acting on such particular clamp member.

It has thus been shown that the practice of this invention provides for surrounding the periphery of diaphragm 14 with a clamping enclosure 30 that defines a transient pressure absorbing chamber 47 which prevents the liquid being transported from leaking between diaphragm 14 and the wall of tank 11 during transient pressure surges. This also helps prevent diaphragm 14 from being forced out of or torn by the clamping mechanism during the pressure surges. The individual clamp members or enclosures 31 and 42 will not be bent or damaged during pressure surges because they are unattached to each other or to the tank wall and hence are freely and individually movable. Any clamp member can be removed from tank 11 through a manway during repair or maintenance operations without affecting the others, and the clamps easily accommodate different sized diaphragms 14 with beads 15 of different sizes and shapes.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A container for a fluid material comprising:
   A. a wall enclosing such material;
   B. a flexible diaphragm in said container, said diaphragm having an enlarged bead around its entire periphery, said bead and the adjacent area of said diaphragm contacting said wall; and C. means for sealing said diaphragm against said wall comprising:
1. a plurality of first fastener elements secured to said wall at spaced intervals, said elements essentially lying in a plane passing through said enclosure;
2. a clamp having one end compressing said adjacent area of said diaphragm, said clamp extending over said bead and said first fastener elements and having an opposite end which contacts but is unattached to said wall; and
3. second fastener elements mating with said first fastener elements for adjustably holding said clamp in compressing engagement with said adjacent area.

2. The invention defined in claim 1 further comprising a resilient gasket having a surface contacting said adjacent area of said diaphragm outside of said plane, and said one end of said clamp contacting the opposite surface of said gasket and compressing said gasket against said adjacent area.

3. The invention defined in claim 2, wherein said gasket is an endless O-ring.

4. The invention defined in claim 1, wherein said first fastener elements are studs having female threads at their inwardly projecting ends and said second fastener elements are bolts which engage said female threads.

5. The invention defined in claim 2, wherein said clamp has a central portion that is generally parallel to the adjacent surface of said wall, a first arm at said one end in a plane which intersects said adjacent surface, said first arm contacting and compressing said gasket, a second arm at said opposite end in another plane which intersects said adjacent surface, said second arm contacting said adjacent surface, and said planes intersecting each other.

6. The invention defined in claims 4, wherein said bolts extend through holes in said central portion.

7. The invention defined in claim 3, wherein the end of said first arm is bifurcated and said O-ring is held between the parts thereof.

8. The invention defined in claim 7, wherein said bifurcated end is shaped like an inverted Y, and said O-ring is compressed in the crotch of said Y.

9. The invention defined in claim 2, wherein a sealant is placed between said adjacent area and said wall directly under said gasket.

10. The invention defined in claim 1, wherein said clamp comprises a plurality of separate independently movable members aligned in the same plane.

11. A container for non-compatible liquids comprising:
A. a wall defining a generally cylindrical tank having a generally horizontal longitudinal axis and dished heads closing its ends;
B. a flexible diaphragm in said tank, said diaphragm having an integral enlarged bead at its terminal edge around its entire periphery; said bead and the adjacent area of said diaphragm contacting said wall, said diaphragm being movable to alternately line opposite portions of said tank so as to define different chambers for said non-compatible liquids; and
C. means for hermetically sealing said diaphragm against said wall comprising:
1. a plurality of studs each having one end secured to said wall at spaced intervals and female threads at its other end, said studs essentially lying in a single vertical plane that generally bisects said enclosure longitudinally;
2. an endless O-ring gasket having a surface contacting said adjacent area of said diaphragm outside of said single plane;
3. a clamp comprising a plurality of separate independently movable members aligned in the same plane, each member having a central portion that is generally parallel to the adjacent surface of said enclosure, a first arm in a plane which intersects said adjacent surface having a bifurcated end, an opposite surface of said O-ring being contacted and compressed by said bifurcated end, a second arm lying in another plane which intersects said adjacent surface, said central portion extending over said bead and said studs and said second arm contacting but being unattached to said wall; and
4. bolts passing through holes in the central portion of said clamp members and mating with the threads on said studs for removably holding said clamp members in compressing contact with said O-ring.

12. A wheeled vehicle for transporting a plurality of non-compatible liquids, comprising:
A. a container for such liquids comprising a generally cylindrical tank having a generally horizontal longitudinal axis;
B. a flexible diaphragm in said tank, said diaphragm having an enlarged bead around its entire periphery, said bead and the adjacent area of said diaphragm contacting the wall of said tank in a first plane which generally bisects said tank, said diaphragm alternately lying against opposite portions of said tank so as to define different chambers for such non-compatible liquids; and
C. means for sealing said diaphragm against said wall, comprising:
1. a plurality of first fastener elements secured to said wall at spaced intervals, said elements essentially lying in a second plane that is spaced from but parallel to said first plane;
2. a series of aligned separate clamps each of which has one end compressing said adjacent area of said diaphragm against said wall, each clamp extending over said bead and a plurality of said first fastener elements and having an opposite end which contacts but is unattached to said wall, each clamp having a first surface facing toward the contents of said tank away from said wall and a second surface facing toward said wall so as to define a transient pressure absorbing chamber enclosing said bead; and
3. second fastener elements mating with said first fastener elements for adjustably holding said clamps in compressing engagement with said diaphragm, said clamps each being independently movable to increase the compressive force it exerts against said diaphragm, whereby during transient pressure surges the pressure rise in said transient pressure absorbing chamber will lag the pressure rise in said tank so as to enable one or more of said clamps to increase the compressive force on said diaphragm and thereby prevent said liquid from being forced between said diaphragm and said wall.

13. The invention defined in claim 12, further comprising a resilient gasket having a surface contacting said adjacent area of said diaphragm, and said one end of each of said clamps contacting the opposite surface of said gasket and compressing said gasket against said adjacent area.

14. The invention defined in claim 13, wherein said gasket is an endless O-ring.

15. The invention defined in claim 12, wherein said first fastener elements are studs having female threads at their inwardly projecting ends and said second fastener elements are bolts which engage said female threads.

16. The invention defined in claim 13, wherein said clamp has a central portion that is generally parallel to the adjacent surface of said wall, a first arm at said one end in a plane which intersects said adjacent surface, said first arm contacting and compressing said gasket, a second arm at said opposite end in another plane which intersects said adjacent surface, said second arm contacting said adjacent surface, and said planes intersecting each other.

17. The invention defined in claim 15, wherein said bolts extend through holes in said central portion.

18. The invention defined in claim 14, wherein the end of said first arm is bifurcated and said O-ring is held in the fork between the bifurcations.

19. The invention defined in claim 18, wherein said bifurcated end is shaped like an inverted Y.

20. A railroad tank car for transporting a plurality of non-compatible liquids, comprising:
   A. a container for such liquids comprising a generally cylindrical tank having each of its ends closed by a dished head and a generally horizontal longitudinal axis;
   B. a flexible diaphragm in said tank, said diaphragm having an integral enlarged bead around its entire periphery, said bead and the adjacent area of said diaphragm contacting the wall of said tank in a first vertical plane which generally bisects said tank longitudinally, said diaphragm alternately lying against opposite portions of said tank so as to define different chambers for such non-compatible liquids; and
   C. means for sealing said diaphragm against said wall comprising:
      1. a plurality of studs each having one end secured to said wall at spaced intervals and female threads at its other end, said studs essentially lying in a second vertical plane that is spaced from but parallel to said first vertical plane;
      2. an endless O-rind gasket having a surface contacting said adjacent area of said diaphragm outside of said second plane;
      3. a series of aligned, separate, independently movable clamps each of which has an arm at one end contacting an opposite surface of said gasket and compressing said gasket against said adjacent area of said diaphragm, each clamp having a central portion that is generally parallel to said adjacent surface and extends over said bead and a plurality of said studs, each clamp having an arm at its opposite end which contacts but is unattached to said wall and each clamp having a first surface facing toward the contents of said tank away from said wall and a second surface facing toward said wall so as to define a transient pressure absorbing chamber enclosing said bead; and
      4. bolts passing through holes in the central portion of said clamp members and mating with the threads in said studs for adjustably holding said clamps in compressing engagement with said gasket, said clamps each being independently movable to increase the compressive force it exerts against said gasket; whereby during transient pressure surges the pressure rise in said transient pressure absorbing chamber will lag the pressure rise in said tank so as to enable one or more of said clamps to increase the compressive force on said gasket and thereby prevent said liquid from being forced between said diaphragm and said wall.

* * * * *